US006321593B1

(12) United States Patent
Rich

(10) Patent No.: US 6,321,593 B1
(45) Date of Patent: Nov. 27, 2001

(54) ELECTRONIC FUEL PUMP, SENDER AND PRESSURE TRANSDUCER TESTER

(75) Inventor: Richard Vinck Rich, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/441,863

(22) Filed: Nov. 18, 1999

(51) Int. Cl.[7] .................................................... G01M 15/00

(52) U.S. Cl. .......................... 73/118.1; 73/119 A; 33/607

(58) Field of Search .................................. 73/119 A, 116, 73/117.2, 117.3, 118.1, 119 R; 33/600, 607; 324/378

(56) References Cited

U.S. PATENT DOCUMENTS

| | | | |
|---|---|---|---|
| 2,073,243 | 3/1937 | Liddell et al. . | |
| 3,292,428 | 12/1966 | Motl . | |
| 4,160,380 | 7/1979 | Dunne, Jr. et al. . | |
| 4,261,209 | 4/1981 | Hatsuno et al. . | |
| 4,712,421 | * 12/1987 | Young | 73/119 A |
| 5,020,362 | * 6/1991 | Hart et al. | 73/119 A |
| 5,499,538 | * 3/1996 | Glidewell et al. | 73/119 A |
| 5,614,668 | * 3/1997 | Ramirez-Soto | 73/119 A |
| 5,633,458 | * 5/1997 | Pauli et al. | 73/119 A |
| 5,681,991 | * 10/1997 | Hatfield et al. | 73/119 A |
| 5,770,796 | * 6/1998 | Sakamoto et al. | 73/119 A |
| 5,773,716 | * 6/1998 | Antonioli et al. | 73/119 A |
| 5,816,220 | * 10/1998 | Stumpp et al. | 73/119 A |
| 6,012,438 | * 1/2000 | Joos et al. | 73/119 A |
| 6,234,002 | * 5/2001 | Sisney et al. | 73/119 A |

* cited by examiner

*Primary Examiner*—Eric S. McCall
(74) *Attorney, Agent, or Firm*—Jerome Drouillard

(57) ABSTRACT

A tester 10 suitable for testing fuel system components of an automotive vehicle such as a fuel pump 34, a fuel sender 36 and a pressure transducer 38 has a housing 12 that is coupled to a power supply 30. Switch $SW_1$ is used to selectively power the fuel pump 34. A second switch $SW_2$ is used to selectively couple power to transducer 38. A final test port $TP_1$ and a second test port $TP_2$ are places where the electrical characteristics of the fuel system components may be measured. For example, the sender resistance and transducer output voltage may be measured.

12 Claims, 1 Drawing Sheet

ELECTRONIC FUEL PUMP, SENDER AND PRESSURE TRANSDUCER TESTER

TECHNICAL FIELD

The present invention relates generally to fuel systems for automotive vehicles, and more particularly, to a method and apparatus for testing the operation of the fuel system, which is particularly suitable for use after assembly of the fuel system components in the vehicle.

BACKGROUND

The fuel system of a vehicle typically includes a fuel pump, a fuel sender, and a pressure transducer. For certain applications these components are coupled together in a single module for assembly onto the vehicle.

Because of the complexity of these modules, assembly plant personnel can misdiagnose or not identify problems with the assembly. Thus, it would therefore be desirable to provide a test system that would provide accurate and reliable results without being time or labor intensive.

Also, after the fuel system module reaches the vehicle assembly plant, there is also a need to test the module assembly. To perform diagnostics on the system, the fuel tank must be drained and removed from the vehicle in order to remove the fuel pump/sender assembly. This operation is very time consuming.

It would be therefore also be desirable to provide a test system that is suitable for use in the final vehicle assembly plant that is capable of providing a reduced test time as well as accurate and reliable results.

SUMMARY OF THE INVENTION

It is therefore one object of the invention to provide a fuel system tester suitable for use in the assembly plant of the fuel module as well as in the final vehicle assembly plant.

In one aspect of the invention, a tester for a fuel system in an automotive vehicle that has a fuel sender, a fuel pump and a pressure transducer includes a power input and an output for coupling to the sender, the fuel pump and the pressure transducer. A first switch is coupled between the input and the output for selectively coupling power to the pump. A second switch is coupled between the input and the output for selectively coupling power to the transducer. A first test port is coupled to the output for measuring a sender electrical characteristic. A second test port is coupled to the output for measuring a transducer electrical characteristic.

In a further aspect of the invention, a method of testing a fuel pump, a fuel sender and a transducer for an automotive vehicle comprises the steps of:

coupling a pressure gauge to a fuel line;

powering a fuel pump;

measuring a maximum fuel system pressure;

determining if the maximum fuel system pressure is greater than a maximum predetermined pressure;

measuring pressure of the fuel line over time to obtain a fuel pressure decay rate;

determining if fuel pressure decay rate is less than a predetermined rate;

measuring an electrical characteristic of a fuel sender assembly;

determining if the electrical characteristic is within a predetermined range;

measuring the voltage of a pressure transducer; and determining if said voltage is within a predetermined range.

One advantage of the invention is that when used in a final vehicle assembly plant, the fuel pump, fuel sender and transducer may be easily disconnected from the vehicle and coupled to the test apparatus. This eliminates any interference from the effect of the electrical system of the vehicle on the test results.

DESCRIPTION OF THE PREFERRED EMBODIMENTS

The present invention is described with respect to fuel system components such as a fuel pump, fuel sender and pressure transducer for conventionally fueled vehicles. However, the present invention may also be applied to those using alternative fuels such as methanol or ethanol.

Figure 1:
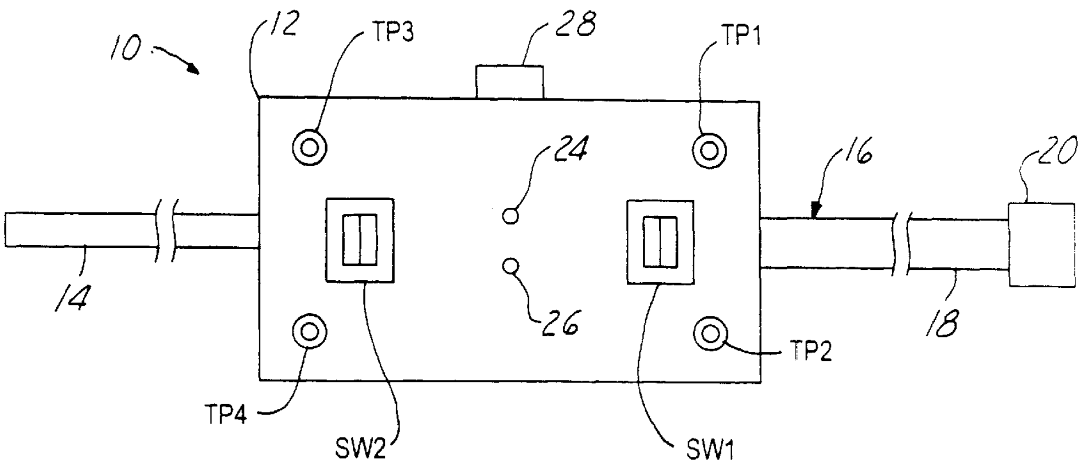
FIG. 1 is a top view of a fuel module tester according to the present invention.

Referring now to FIG. 1, tester 10 is shown having a housing 12, a power input 14 and an output 16.

Figure 2:
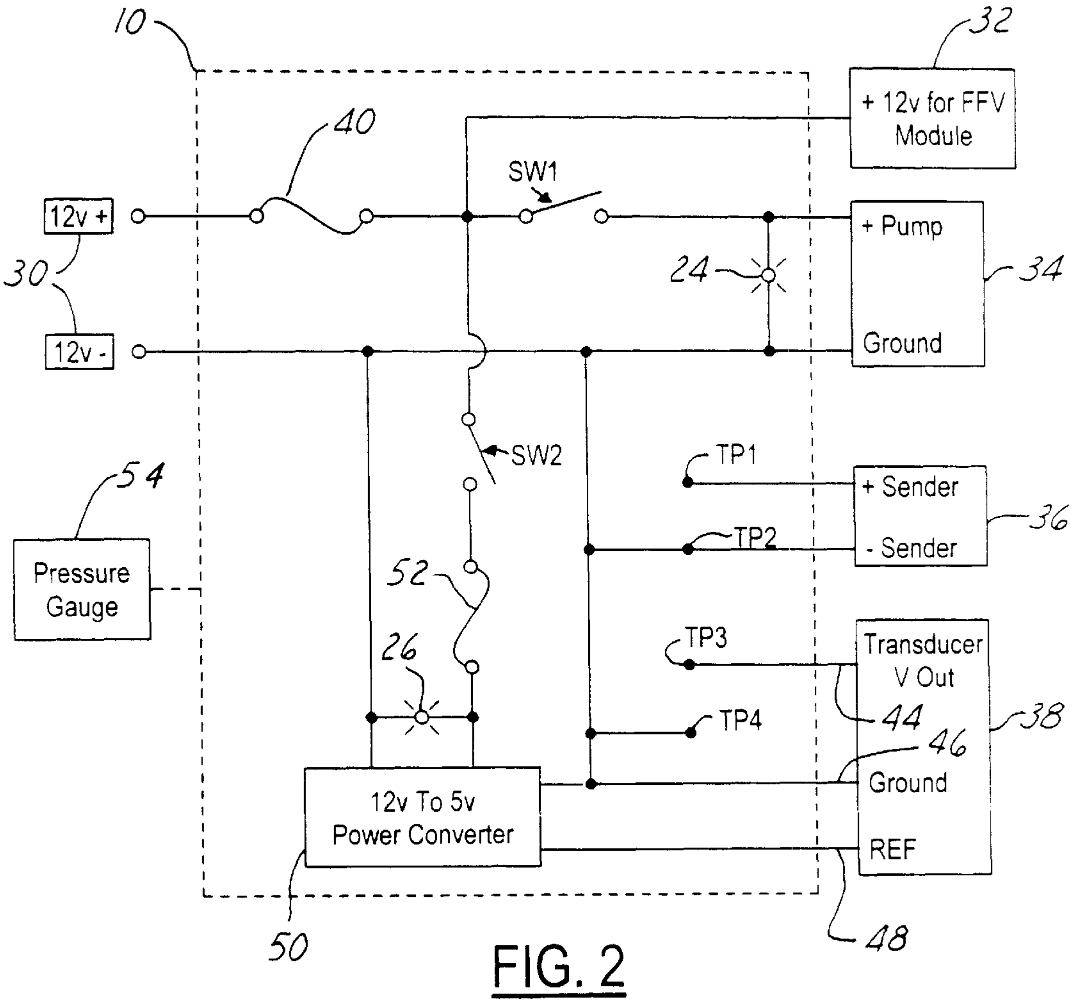
FIG. 2 is a schematic view of a fuel module tester of FIG. 1.

Power input 14 is coupled to a power source shown in FIG. 2. Power source is preferably a DC power source such as that typically found in a vehicle. Commonly, 12 volt power sources are found in vehicles. This allows the fuel system components to be tested using vehicle voltage.

Output 16 has a wiring harness 18 and a connector 20. The wiring harness 18 and connector 20 preferably have a plurality of conductors so that connector 20 need only be connected once to test the fuel system components. Because the connector on the vehicle for the fuel system includes electrical connections to the various components, connector 20 is preferably shaped to mate with the particular connector of the vehicle for which tester 10 is designed. Of course, one skilled in the art would recognize that various adapters may be used between connector 20 and the vehicle so that the connector may be mated to various vehicles.

Housing 12 is preferably a durable housing such as a plastic or metal housing that surrounds and protects the internal components as described below. Externally, the housing 12 has a switch $SW_1$ that is used to provide power from a power source to connector 20. In the On or conducting position, power is provided to connector 20. In the Off or non-conducting position, power is not supplied to connector 20. Switch $SW_1$ may be one of a plurality of types of switches known to those skilled in the art, including a toggle switch or a push button switch. Preferably $SW_1$ is in the non-conducting state when connector 20 is coupled to the fuel components to be tested.

A second switch $SW_1$ is incorporated into housing 12. $SW_2$ is for selectively powering a transducer shown below in FIG. 2. Similar to that of $SW_1$, $SW_2$ may be a toggle, push button or other switch as would be evident to those skilled in the art.

Test ports $TP_1$ and $TP_2$ are also incorporated into housing 12. Test ports $TP_1$ and $TP_2$ are coupled to input 16 and ultimately coupled to the sender of the components to be tested. Test ports $TP_1$ and $TP_2$ are used for testing the functioning of sender as will further be described below.

Test ports $TP_3$ and $TP_4$ are also incorporated into housing 12. Test ports $TP_3$ and $TP_4$ are coupled to output 16 and to the pressure transducer to be tested.

Housing 12 may also have indicator lights 24 and 26 to indicate the operation of the circuit. For example, indicator 24 may be used to indicate that the pump is powered. Indicator 26 may be used to indicate the transducer is powered. Indicators 24, 26 may, for example, be light emitting diodes or incandescent lamps. They may be differently colored or similarly colored.

Housing 12 may also have a circuit breaker portion 28. Circuit breaker portion 28 is positioned toward the exterior of housing 12 to provide easy access for replacement of the circuit breaker contained therein.

Referring now to FIG. 2, tester 10 is shown coupled to a 12 volt power source 30, a flex fuel vehicle module 32, a pump 34, a fuel sender 36, and a pressure transducer 38. For simplicity, the connector 20 shown in FIG. 1 has been eliminated. Flex fuel vehicle module 32 is used for vehicles having the capability of using different fuels such as methanol. Flex fuel vehicle module 32 is optional.

A circuit breaker 40 is coupled between power source 30 and the remaining portions of the circuit for protection. In the present example, a 10 amp circuit breaker is used. Twelve volt power is supplied to flex fuel vehicle module 32, and to pump 34 through switch $SW_1$. Ground potential is also supplied to pump 34. Indicator light 24 is coupled between power and ground of pump 34 to indicate power is being supplied.

Sender 36 is preferably resistive in nature. Thus, sender 36 is coupled to ground potential of power source 30. A positive terminal and negative terminal of sender 36 are coupled respectively to test ports $TP_1$ and $TP_2$. This allows an Ohm meter to be coupled therebetween to determine the operability of sender 36.

Transducer 38 has three terminals: V out terminal 44, a ground terminal 46, and a reference terminal 48. The present pressure transducer 38 operates using a 5 volt operating voltage. Therefore, a power converter 50 is coupled between power source 30 and transducer 38. Power converter 50 is a DC to DC power converter that converts the 12 volts of power source 30 into 5 volts for input to reference terminal 48. Of course, if pressure transducer operating at a different voltage is used, power converter 50 may be eliminated or changed. Power converter 50 is coupled to power source 30 through switch $SW_2$ and a fuse 52. Indicator 26 is coupled between the input to power converter 50. Indicator 26 thus indicates power is being provided to power converter 50.

Test ports $TP_3$ and $TP_4$ may be used to measure the proper operation of transducer 38. Test port $TP_3$ is coupled to the voltage output 44 of transducer 38. Test port $TP_4$ is coupled to ground 46 of transducer which is a common ground to power source 30.

A voltmeter (not shown) may be coupled into tester 10. The voltmeter, may for example be permanently coupled at test port $TP_3$ and $TP_4$. Likewise, an Ohm meter (not shown) may be coupled to test ports $TP_1$ and $TP_2$ within tester 10.

Although not shown above, a pressure gauge 54 will also be incorporated into tester 10. Pressure gauge 54 would allow the pressure of the fuel lines to be monitored.

In operation, during assembly of the fuel system or the assembly of the fuel system into the vehicle, it may be desirable to test the fuel system. Tester 10 is coupled to power source 30 that may be the battery of the vehicle or an off vehicle power source. Preferably, switches $SW_1$ and $SW_2$ are open and output 16 is not coupled to any of the components to be tested. If the system to be tested is already assembled onto the vehicle, the body harness connector is separated so that connector 20 may be coupled thereto. Pressure gauge 54 is preferably coupled to a fuel line such as the Schrader valve of a fuel rail. Pump 34 is activated by closing switch $SW_1$ for approximately 5 seconds. The maximum fuel system pressure is measured. Typical fuel systems have a maximum system pressure of 55 or 65 psi. The decay rate of pressure loss is measured after $SW_1$ is opened. If for example the pressure loss is less than 5 psi over 5 minutes, the fuel pump is operating properly.

Next, sender 36 is checked for operability. An electrical characteristic of sender 36 is monitored. For a conventional unleaded internal combustion engine, sender 36 is likely to be a resistive sensor that indicates various resistances for an empty fuel tank or a full fuel tank. For example, sender may indicate 15 Ohms for an empty fuel tank and 160 Ohms for a full fuel tank. If the vehicle is a flexible fuel vehicle, sender 36 may use another electrical characteristic such as voltage to indicate the level of fuel in the vehicle. In one example, the sender of a flex fuel vehicle indicates 0.4 volts for empty and 3.5 volts for full.

To test the pressure transducer, the switch $SW_2$ is closed to provide power to transducer 38. The pressure transducer outputs a voltage based on the pressure within the fuel tank. In one example, the pressure transducer generates voltages between 0.8 volts and 4.4 volts where the atmospheric pressure reading is about 2.6 volts. Thus, if a voltmeter is coupled between test ports $TP_3$ and $TP_4$, the voltage may be measured.

Because of the convenience of having the test circuitry contained within a single housing, operational problems of the fuel system may be accurately and reliably determined. Also, because of its convenience, the tester will reduce the time required to perform such tests.

While particular embodiments of the invention have been shown and described, numerous variations and alternate embodiments will occur to those skilled in the art. Accordingly, it is intended that the invention be limited only in terms of the appended claims.

What is claimed is:

1. A tester for a fuel system of an automotive vehicle, the fuel system including a fuel sender, a fuel pump and a pressure transducer, the tester comprising:

a power input;

an output for coupling to the fuel sender, the fuel pump and the transducer;

a first switch coupled between the input and the output for selectively coupling power to said pump;

a second switch coupled between the input and the output for selectively coupling power to said transducer;

a first test port coupled to said output for measuring a sender electrical characteristic of said sender; and a second test port coupled to said output for measuring a transducer electrical characteristic of said transducer.

2. A tester as recited in claim 1 wherein said sender electrical characteristic is sender voltage.

3. A tester as recited in claim 1 wherein said sender electrical characteristic is sender resistance.

4. A tester as recited in claim 1 wherein said transducer electrical characteristic is transducer output voltage resistance.

5. A tester as recited in claim 1 further comprising a power converter coupled to said power input and said output for reducing power to the transducer.

6. A tester as recited in claim 1 wherein said output comprises a wiring harness and a connector.

7. A tester as recited in claim 6 wherein said connector comprises an eight pin connector.

8. A tester as recited in claim 1 further comprising a first indicator for indicating the application of power to said pump.

9. A tester as recited in claim 1 further comprising a second indicator for indicating the application of power to said transducer.

10. A tester as recited in claim 1 further comprising a pressure gauge for measuring fuel pressure in a fuel line.

11. A tester for a fuel system of an automotive vehicle, the fuel system including a fuel sender, a fuel pump and a pressure transducer, the tester comprising:

a housing;

an input coupled to the housing for coupling to an external power source;

an output coupled to the housing for coupling to a fuel sender, a fuel pump and a transducer;

a first switch coupled between the input and the output for selectively coupling power to said pump;

a second switch coupled between the input and the output for selectively coupling power to said transducer;

a first test port coupled to said output for measuring a sender electrical characteristic of said sender; and a second test port coupled to said output for measuring a transducer electrical characteristic of said transducer.

12. A tester as recited in claim 11 further comprising an ohm meter for measuring a resistance of the fuel sender and a voltmeter for measuring a voltage of the pressure transducer coupled to the housing.

* * * * *